United States Patent [19]

Martin

[11] Patent Number: 5,573,184
[45] Date of Patent: Nov. 12, 1996

[54] HEATING DEVICE FOR MOTOR VEHICLES

[76] Inventor: Hans Martin, Wartbergstrasse 27, 70191 Stuttgart, Germany

[21] Appl. No.: 490,626

[22] Filed: Jun. 15, 1995

[30]  Foreign Application Priority Data

Jun. 15, 1994 [DE] Germany .......................... 44 20 841.3

[51] Int. Cl.$^6$ ...................................... F24C 9/00
[52] U.S. Cl. ...................... 237/12.3 R; 122/26; 126/247
[58] Field of Search ............... 122/26; 126/247; 237/1 R, 12.3 R

[56]  References Cited

U.S. PATENT DOCUMENTS

| | | | |
|---|---|---|---|
| 3,952,723 | 4/1976 | Browning | 126/247 |
| 4,004,553 | 1/1977 | Stenstrom | 122/26 |
| 4,277,020 | 7/1981 | Grenier | 237/1 R |
| 4,312,322 | 1/1982 | Freihage | 126/247 |
| 4,370,956 | 2/1983 | Moser et al. | 237/12.3 R |
| 4,420,114 | 12/1983 | Moser et al. | 237/1 R |
| 4,462,386 | 7/1984 | Powell | 126/247 |
| 4,728,029 | 3/1988 | Griebel et al. | 237/12.3 R |
| 4,733,635 | 3/1988 | Menard et al. | 237/12.3 R |
| 4,974,778 | 12/1990 | Bertling | 126/247 |

FOREIGN PATENT DOCUMENTS

| | | |
|---|---|---|
| 2266122 | 10/1975 | France . |
| 2674797 | 10/1992 | France . |
| 3147468 | 12/1982 | Germany . |
| 2003265 | 3/1979 | United Kingdom . |

*Primary Examiner*—William E. Tapolcai
*Attorney, Agent, or Firm*—Foley & Lardner

[57]  ABSTRACT

A heating device for motor vehicles, in particular a supplementary heating device for motor vehicles with a fluid-cooled internal combustion engine. The heating device operates according to the principle of fluid friction; a rotor that rotates in a working chamber, which chamber is completely filled with viscous fluid, is driven by an engine of the vehicle. As the rotor rotates, the viscous fluid emits its heat to a coolant, preferably the cooling water of the internal combustion engine. This heating device is switched on and off by an electromagnetic clutch which connects and disconnects the rotor to the drive engine of the vehicle. This heating device is of simple design, operates reliably, is maintenance-free and can be switched on and off precisely. The heating device can be mounted in the vehicle as desired, shortens the warming-up phase, in particular in the case of diesel engines, and can be used as a heating device even with hybrid drives.

19 Claims, 4 Drawing Sheets

HEATING DEVICE FOR MOTOR VEHICLES

BACKGROUND OF THE INVENTION

The invention relates to a heating device for motor vehicles, in particular, a supplementary heating device that includes a working chamber filled with a viscous fluid and a rotor that rotates in the working chamber.

Such a heating device has been disclosed by DE-A-38 32 966. Unlike the heating device of the prior art, however, the invention is not restricted to motor vehicles with fluid-cooled internal combustion engines, but also has application in electric vehicles and vehicles with so-called hybrid drive, i.e. with a combined drive comprising an electric motor and internal combustion engine.

The known heating device according to DE-A-38 32 966, which corresponds to U.S. Pat. No. 4,974,778 issued Dec. 4, 1990 to Bertling (which is hereby incorporated by reference), discloses a supplementary heating device for fluid-cooled internal combustion engines which produces heat as a result of fluid friction and emits said heat to the cooling water of the internal combustion engine. The heat is produced by a pot-shaped rotor which is continuously driven by the internal combustion engine and rotates in a working chamber. The working chamber is only partially filled with a viscous medium. Next to this working chamber there is a reservoir chamber which is connected to the working chamber via an inflow port and a return port.

The prior-art heating device is regulated by means of a temperature-controlled valve which controls the flow of viscous medium from the reservoir chamber into the working chamber. If the temperature drops below a specific coolant temperature, the valve opens and viscous medium flows into the working chamber. If the temperature exceeds a specific coolant temperature, the valve closes and the viscous medium is pumped out of the working chamber. However, because of the heating device's configuration, it is not possible to pump all the oil out of the working chamber. As a result of the continuously running drive of the rotor, the remaining oil continues to produce a certain degree of residual heat which is passed on to the cooling water. This residual heat is not desired when the warming-up phase of the engine has finished. Likewise, this continuous idling, subject to friction, means a loss of power for the internal combustion engine.

Moreover, the function of this known heating device is questionable during operation of the device. Because the (dynamic) pressure in the working or friction gap is higher than the pressure, produced by the force of gravity, on the oil outside the working gap, the working gap (which produces the heat) cannot be filled continuously, especially since the oil is also not pumped away continuously. Therefore, when the valve is opened the oil only passes into the working gap in an uncontrolled manner, i.e. randomly, and therefore produces virtually no heat.

DE-A-31 47 468 discloses a further heating device which operates according to the principles of a hydrodynamic brake. The impeller of the brake is driven by the internal combustion engine via a V-belt drive. The brake is switched on and off via an electromagnetic clutch. The hydrodynamic brake has, inter alia, the disadvantage that the heating effect is relatively low at low speeds of the driving motor, which is disadvantageous particularly when the machine is idling in the warming-up phase.

SUMMARY OF THE INVENTION

One object of the invention is to provide a heating device for motor vehicles which is of a simple, space-saving design, is economical to manufacture, and which nevertheless operates with a good degree of efficiency, particularly at low engine speeds.

This object is achieved by providing a fixed housing with a working chamber having an inner wall provided in the fixed housing. The working chamber comprising a closed chamber for containing a viscous fluid. A cooling chamber is provided in the housing, which is adapted to have a cooling fluid flow therethrough. Also in the housing is an intermediate wall that forms a heat-conducting connection between the working chamber and the cooling chamber. Rotatably mounted in the working chamber is a rotor that with the inner wall of the working chamber forms at least one gap. A switchable clutch is provided to selectively drive the rotor.

The objective of the invention is also achieved by providing a fixed housing with a working chamber constructed as an enclosed chamber which is completely filled with viscous fluid. A cooling chamber is provided in the fixed housing through which cooling fluid flows. The cooling chamber is connected to the working chamber via an intermediate wall in a heat-conducting fashion. A rotor which is driven by the engine rotates and forms at least one gap with an inner wall of the working chamber. The rotor is selectively driven by the engine through a switchable clutch.

The heating device according to the invention provides an effective heating system that can be used both in vehicles with a fluid-cooled internal combustion engine, and also in vehicles with an electric motor or with a hybrid drive. The device is provided with simple means and a low degree of outlay. Accordingly, the invention can provide a supplementary heating device for engines, such as Diesel-engines, that typically have high combustion efficiency with low heat performance.

The heating device has only one chamber which is closed and completely filled with viscous medium and, when required, can be connected into a circuit by means of a suitable clutch and disconnected when not required. The invention is based on the fact that a completely filled, stationary working chamber controls the viscous medium in the at least one gap. The present invention is unlike the prior art that is not operative because, among other reasons, the working gap in the prior art cannot be filled in a controllable way owing to the pressure conditions which are established. Moreover, in the present invention, the necessary wetting of the working gaps and a constant filling level, which is continuously maintained during operation, is achieved because of the completely filled working chamber.

The heating device according to the invention therefore dispenses with a reservoir chamber and the associated filling control used in the prior art, and instead uses a clutch for control. As a result, the heating device is completely disconnected from the drive when not required, and thus the device produces no losses or undesired heat. The connection into the circuit and the disconnection are carried out precisely and without delay either automatically as a function of specific sensors or manually.

The heating device according to the invention is of a very compact design and can be mounted both on the engine block and on the vehicle itself, at any desired point. The heat transmitted to the coolant can be emitted to cooling water—in the case of fluid-cooled internal combustion engines—or—in the case of other drives—can be fed to a suitable heat exchanger for heating the passenger compartment.

A further advantage of the heating device according to the invention consists in the fact that the heating power or the production of heat in the working chamber rises digressively with the increasing speed of the driving motor (and not progressively such as in the case of a hydrodynamic brake according to the prior art) because, as a result of the increase in temperature in the working chamber, the viscosity of the oil decreases and so too does the fluid friction which produces the heat. As a result, the heating power is matched to the coolant temperature and the engine is stressed less at higher speeds of revolution.

Another objective of the invention is that an electromagnetic clutch is provided which permits the heating device to be switched on and off reliably and without inertia. Advantageously, the magnet of the clutch can be arranged inside a belt pulley and can act on an armature plate, which is arranged at the end of the belt pulley and is connected to the rotor shaft. As a result, a compact design for the entire heating device, including the drive, is obtained.

According to another objective of the invention, the rotor is constructed as a disk. This disk which makes a heating device possible which is easy to manufacture and of axially short design, and at the same time provides a smooth, level or ribbed, but effective cooling surface on the outside of the working chamber. The heat which is produced as a result of liquid friction in the working chamber is thus transmitted directly to the coolant at the end via the intermediate wall. In order to increase the heat-producing surface, the rotor can also be made longer in the axial direction so that the cylindrical circumferential face also participates in the production of heat by fluid friction. Such a rotor can also be advantageously produced from plastic, which reduces manufacturing costs.

Furthermore, according to the invention, the intermediate wall, which serves as the heat-emitting surface, can be shaped differently in order to increase the conduction and transfer of heat. According to one particular embodiment, the wall is essentially level, which is particularly easy to manufacture. With a wider rotor (cylinder), the wall can also additionally be cylindrical. In an alternative embodiment, in order to increase the transfer of heat, cooling ribs or cooling ducts are advantageously provided on the water side of the intermediate wall. Also, advantageously the cooling chamber and the working chamber are not sealed directly with respect to one another but instead are each separately sealed off from the outside. As a result, in the case of a leak, the viscous fluid is prevented from mixing with the cooling fluid.

According to a further advantageous embodiment of the invention, the cooling chamber can also be arranged around the working chamber, i.e. it is composed of an end-side cooling gap, a rear cooling gap and a circumferential cooling gap. As a result, heat-absorbing and heat-emitting surfaces are matched to one another.

Finally, in another advantageous development of the invention, an elastic diaphragm is provided between the working chamber and the air side (or also the cooling water side). The elastic diaphragm permits a temperature-dependent expansion of the viscous medium into an expansion space—the latter can be connected to the atmosphere via a venting duct. The movable diaphragm can, preferably, be arranged between the working chamber and a bearing where a corresponding expansion space is also produced, but also at another point, e.g. on the end side of the intermediate wall or else in the rotor. By means of this diaphragm the temperature-dependent expansion of the viscous fluid is allowed for and the complete filling of the working gap is thus ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

Exemplary embodiments of the invention are illustrated in the drawings and explained in greater detail below. In the drawings.

DETAILED DESCRIPTION OF THE PREFERRED EMBODIMENTS

Figure 1:
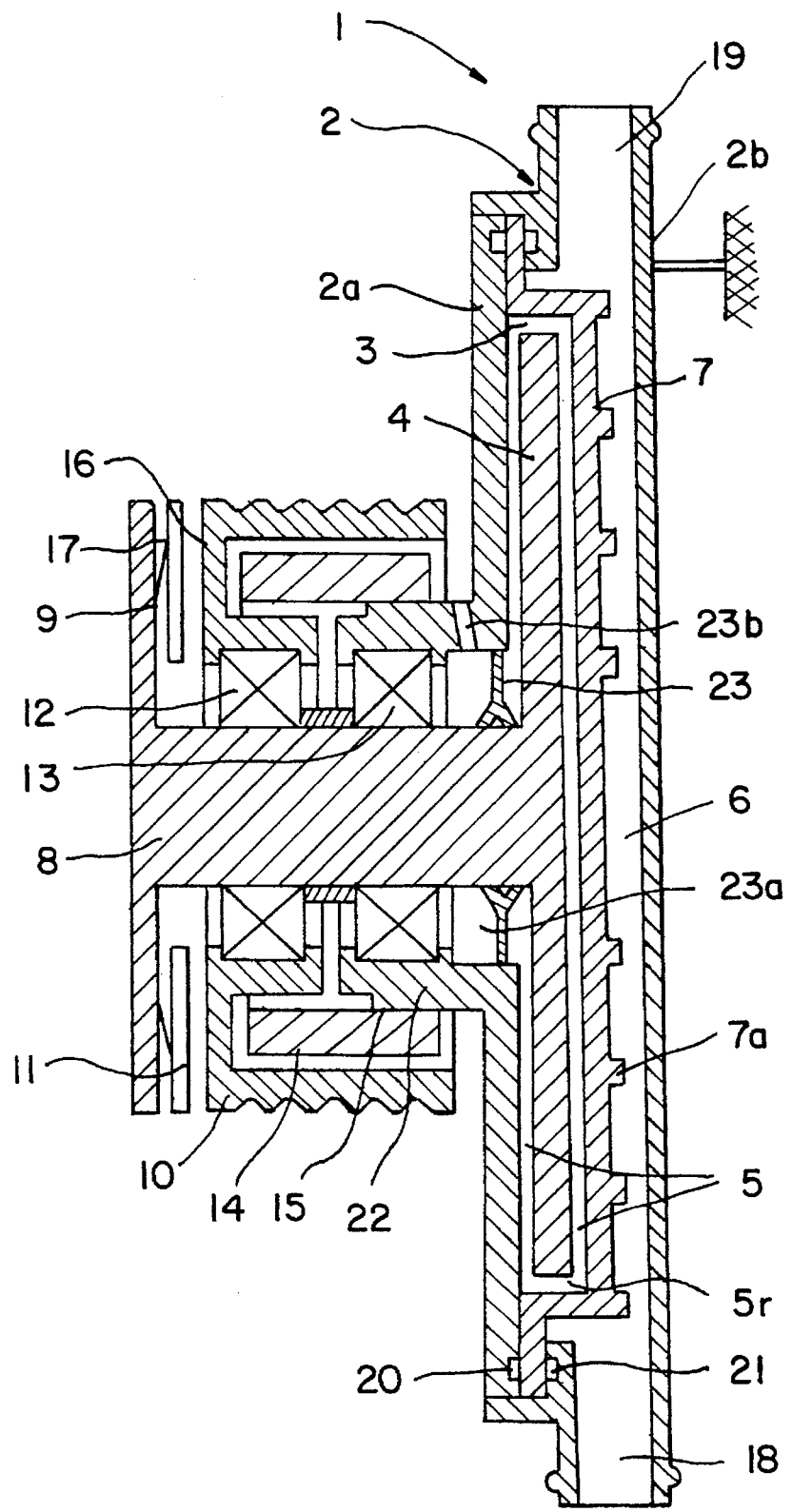
FIG. 1 shows a heating device with a simple cooling chamber.

FIG. 1 shows a heating device 1 according to the invention. The heating device 1 has a housing 2 which is mounted on a vehicle or on an engine, and thus creates a fixed housing (the mounting is illustrated here symbolically). This fixed housing 2 has a working chamber 3 in which a rotor 4 of a disk-shaped construction rotates, and in addition has a cooling chamber 6 through which coolant flows. The coolant enters through an inlet connector 18 and leaves again through an outlet connector 19. The entire housing is composed principally of three components; specifically, a housing cover or lid 2a, a housing floor 2b, and an intermediate wall 7, which is sealed with respect to the lid 2a and the floor 2b on both sides by means of sealing rings 20 and 21. The intermediate wall 7 can be optionally provided with cooling ribs 7a on a water cooling side; that being the side opposite the working chamber 3.

The rotor 4 is mounted on a drive shaft 8 which is mounted with respect to the housing 2 by means of a ball bearing 13, specifically by means of a bearing projection 22 on the housing cover 2a. A further bearing 12 is arranged on the drive shaft 8, which bearing 12 bears, via a hub 16, a V-belt pulley 10 which is driven by the engine of the vehicle via a V-belt, shown in FIG. 4. At the end of this V-belt pulley 10 an armature plate 11 is arranged which is connected via drivers 17 to a flange 9 of the drive shaft 8. Within the V-belt pulley 10, which is of hollow construction, there is an annular magnet 14 that is held with respect to the housing 2, on its bearing projection 22 by means of an interference fit 15. This electromagnet is switched on and off by means of control lines (not illustrated).

The working chamber 3 is filled completely with a viscous fluid, for example commercially available silicone oil, so that both the front and the rear working gaps 5 and the radial annular gap 5r are filled with viscous fluid. The working chamber 3 is sealed with respect to the air side by means of a diaphragm 23, which is arranged between the bearing projection 22 and the rotor shaft 8. Between the diaphragm 23 and the ball bearing 13 there is a compensation space 23a into which the diaphragm 23 of elastic construction can move when the viscous fluid expands as the result of changes in temperature. For this purpose, there is also a venting hole 23b arranged in the housing projection 22. The venting hole 23b produces a connection between the compensation space 23a and the atmosphere 23b.

The function of the heating device according to the invention is as follows: when heating is required for the vehicle, the electromagnetic clutch, consisting of the annular magnet 14 and armature plate 11 arranged at the end of the V-belt pulley 10, is activated so that the armature plate 11 is attracted to the V-belt pulley 10 and transmits its torque in a frictionally engaging way, specifically via the axially movable drivers 17, to the flange 9, the drive shaft 8 and to the rotor 4. This results in a relative speed of rotation between the rotor 4 and the housing 2 as a result of the housing 2 being fixed. This relative speed of rotation leads to the viscous fluid in the working chamber 3 being heated up as a result of fluid friction. This heat is transmitted to coolant flowing through the cooling chamber 6 via the heat-conducting intermediate wall 7. This coolant can be fed to a heating element (not illustrated) of the vehicle provided for heating the passenger compartment. When there is no further requirement for heating, the magnet 14 is switched off, the armature plate 11 drops off from the V-belt pulley 10 and the magnetic flux between the engine-side drive and the rotor 4 is interrupted; thereafter, the rotor 4 becomes stationary.

Figure 2:
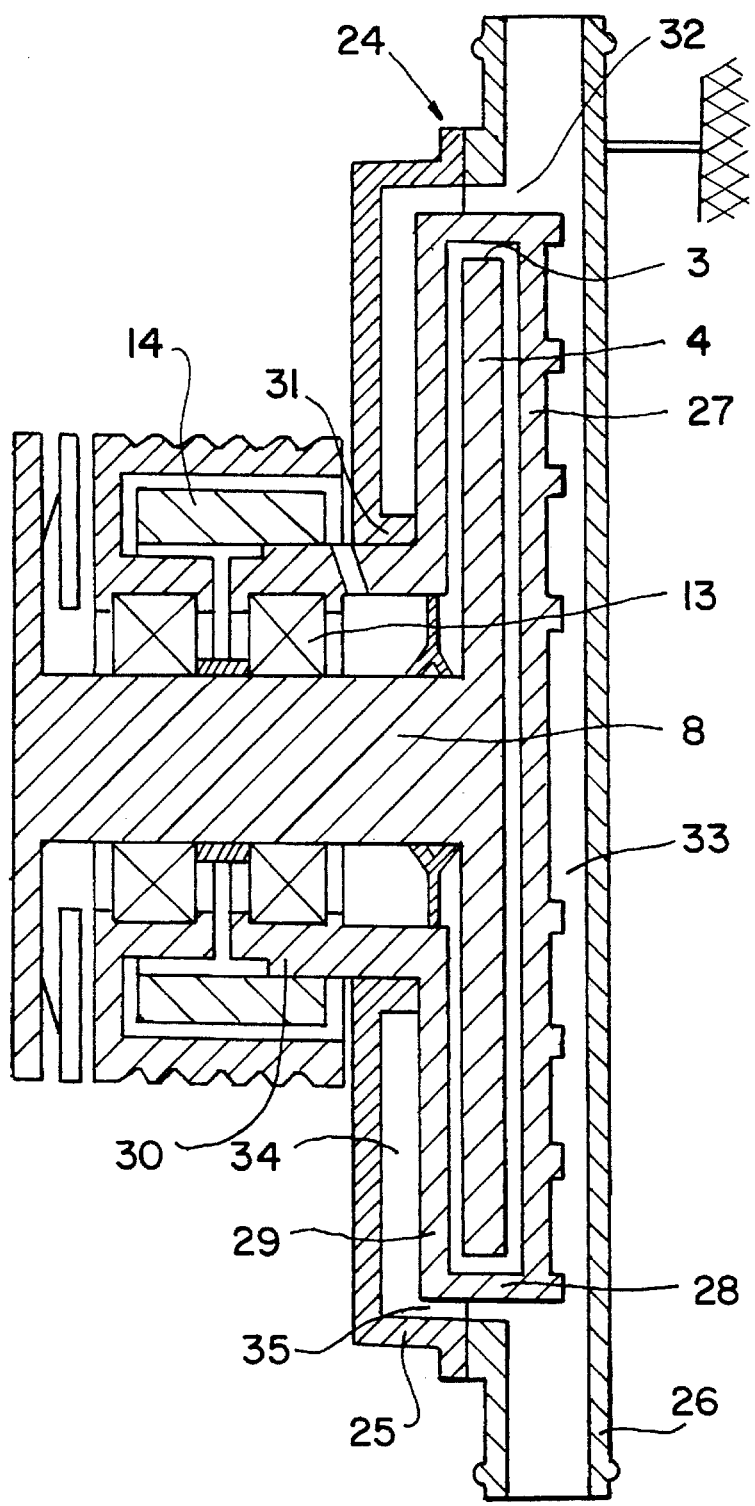
FIG. 2 shows a heating device with an enlarged cooling chamber.

FIG. 2 shows a further exemplary embodiment in which identical parts are designated by identical reference numbers, as in FIG. 1. Only the housing 24 is different than in the first embodiment. The housing is composed of a housing cover 25 and a housing floor 26, which are connected directly to one another and sealed together to enclose the cooling chamber 32. Within the housing 24 there is a further housing in the form of a hollow disk. The hollow disk is formed by a front, planar end wall 27, a rear wall 29, and a cylindrical circumferential wall 28. This hollow disk forms the working chamber 3 for the viscous medium. The hollow disk is mounted and sealed in a housing projection 31 by means of a hub 30. The hub 30 also receives the bearing 13 for supporting the drive shaft 8.

Thus, in this second exemplary embodiment an enlarged cooling chamber 32 is produced which is composed of three subspaces: the front, end-side cooling gap 33, the rear cooling gap 34 and the circumferential cooling gap 35. As a result, a large cooling surface is provided which completely surrounds the working chamber 3 so that the heat produced therein can be transmitted to the coolant directly via all the walls of the hollow disk. This results in an improved level of efficiency for this heating device which otherwise functions in the same way as described above for FIG. 1.

Figure 3:
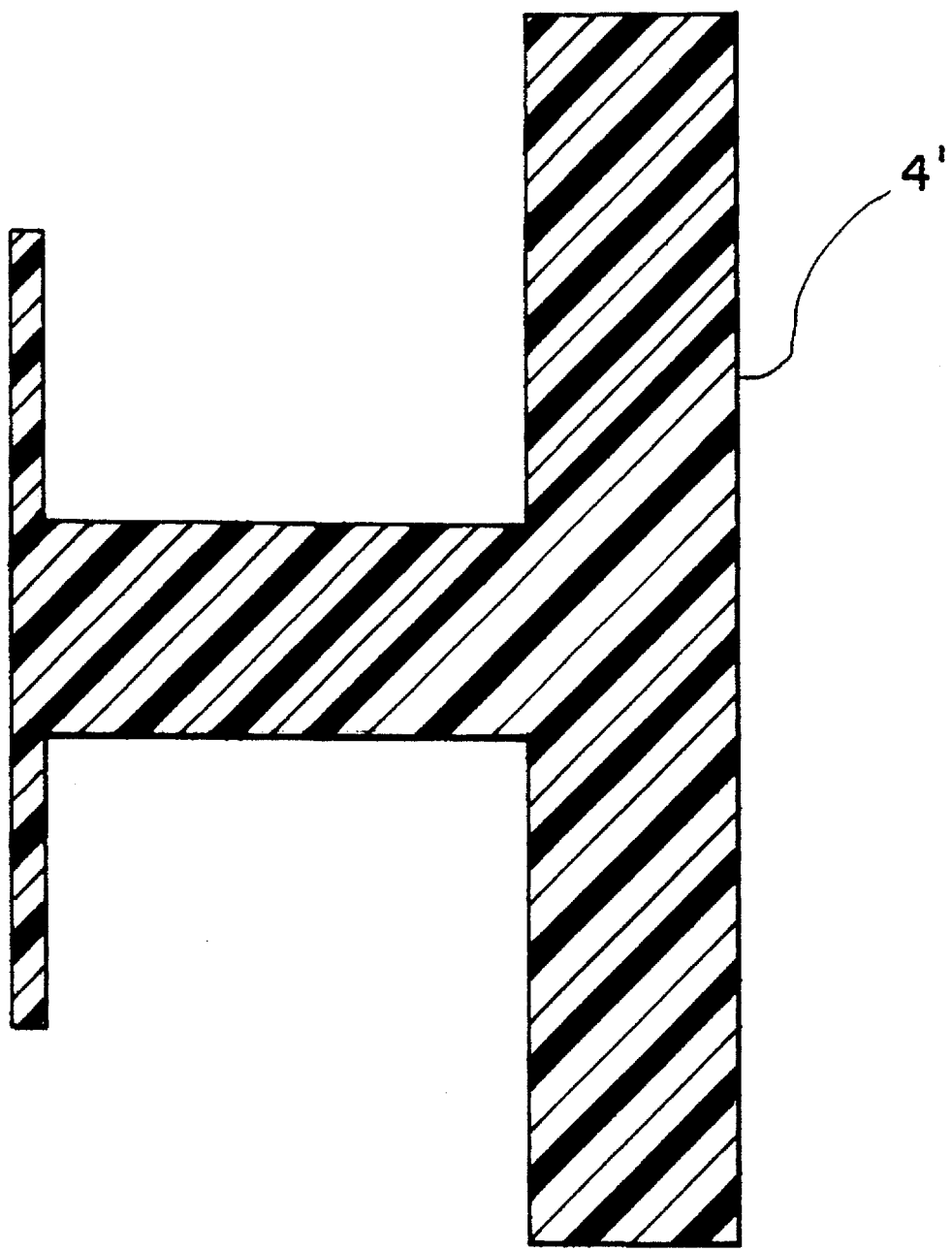
FIG. 3 shows a cylindrical rotor.

FIG. 3 illustrates a rotor 4' that is a cylinder that may be used instead of the disk shown in FIG. 1. Although FIG. 3 shows that the rotor 4' is a solid plastic component, it is to be understood that the rotor 4' can be made out of any suitable material which will allow the heating device to operate properly.

Figure 4:
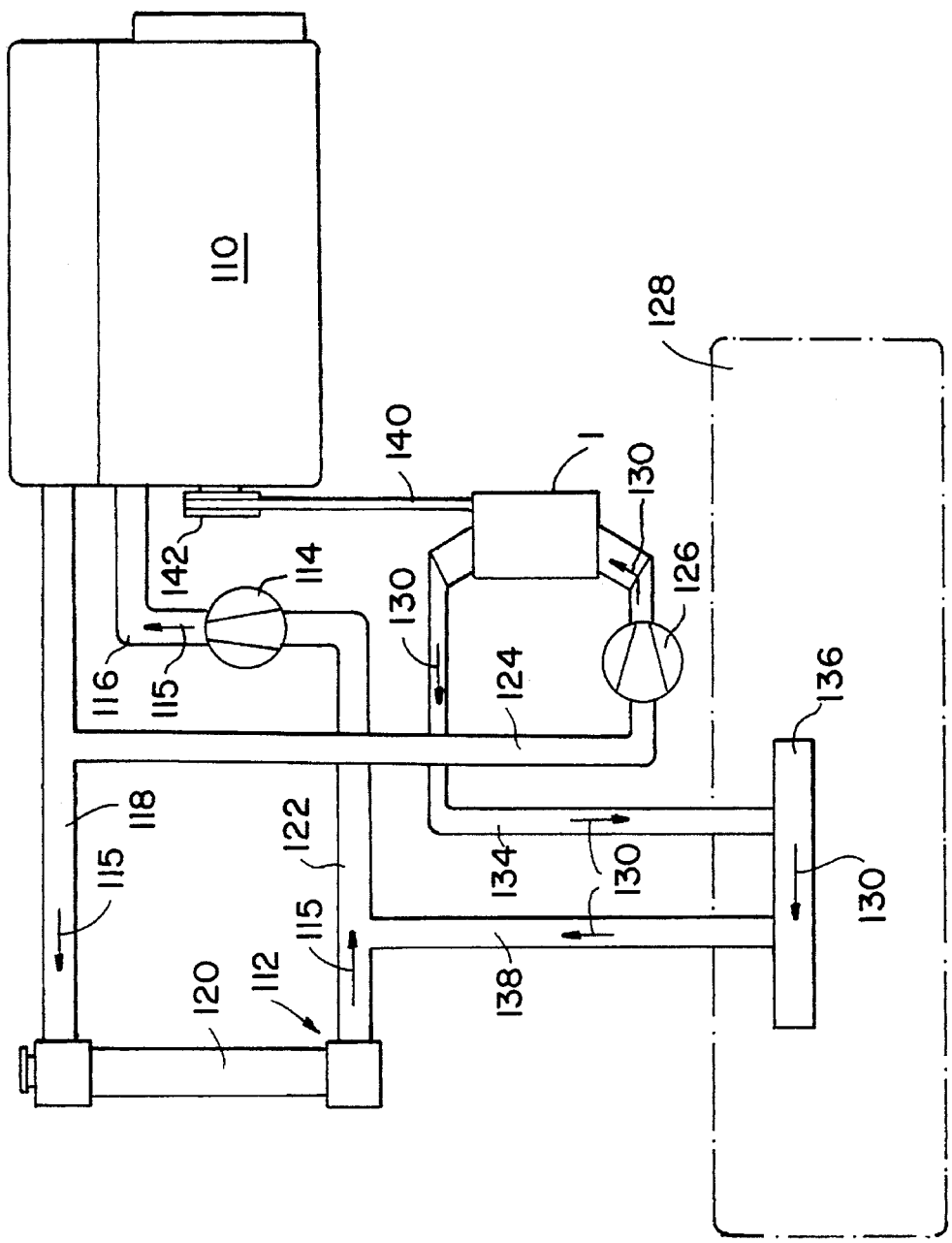
FIG. 4 shows the heating device in use with an engine.

FIG. 4 shows the heating device 1 according to the invention drivingly connected by a drive belt 140, which in the preferred embodiment comprises a V-belt, with an output shaft 142 of an internal combustion engine 110. Although not shown in FIG. 4, the V-belt 140 engages the V-belt pulley 10 of the heating device 1. The internal combustion engine 110 is cooled by a liquid flowing through a coolant medium circulating circuit 112. The coolant medium circuit 112 has a coolant medium pump 114 conductively connected with a pressure conduit 116, which connects to passages in the housing of the internal combustion engine 110. A conduit 118 is also connected with the passages in the housing of the internal combustion engine 110. The conduit 118 is also connected to an air-cooled cooler 120. The cooler 120 is connected via a return conduit 122 with the coolant medium pump 114. The pump 114 supplies the cooling fluid in the direction of arrow 115 through the pressure conduit 116, into the passages of the internal combustion engine 110, and then into the conduit 118. The cooling fluid flows from the conduit 118 into the cooler 120, and from there, after being cooled, is fed through the conduit 122 to the coolant medium pump 114, and then, into the pressure conduit 116 and the housing of the internal combustion engine 110.

The conduit 118, which leads the heated cooling fluid away from the engine 110, is connected with a supply or branching conduit 124 that leads to a feeding pump 126. The feeding pump 126 is part of a heating circuit that includes heat device 1, connecting conduit 134, heat exchanger 136, and conduit 138. The heating circuit heats the passenger space 128 of a vehicle. The feeding pump 126 supplies the heated cooling fluid in the direction of arrows 130 through the connecting conduit 134 and the heating device 1 to a heat exchanger 136 in the passenger space 128, and then through conduit 138. The conduit 138 extends from the heat exchanger 136, and is conductively connected with the return conduit 122 of the coolant medium circuit 112. By providing the heating device 1 in this arrangement, the invention operates as a supplementary heating device for the vehicle.

It will be understood that various modifications in the form of the invention as described herein in its preferred embodiments may be made without departing from the spirit thereof and the scope of the claims which follow.

What is claimed is:

1. A heating device, and heating device comprising:

a fixed housing;

a working chamber having an inner wall provided in said fixed housing, said working chamber comprising a closed chamber for containing a viscous fluid;

a cooling chamber provided in said housing and adapted to have a cooling fluid flow therethrough;

an intermediate wall that forms a heat-conducting connection between said working chamber and said cooling chamber;

a rotor rotatably mounted in said working chamber, said rotor and said inner wall of said working chamber forming at least one gap; and a switchable clutch to selectively drive said rotor.

2. The heating device as claimed in claim 1, wherein said switchable clutch comprises an electromagnetic clutch.

3. The heating device as claimed in claim 2, further comprising a V-belt pulley and a drive shaft for said rotor, wherein said electromagnetic clutch comprises an armature plate arranged in the direction of a force flux between said drive shaft and said V-belt pulley.

4. The heating device as claimed in claim 2, wherein the electromagnetic clutch has an annular magnet arranged inside a V-belt pulley and is mounted on said fixed housing by an interference fit.

5. The heating device as claimed in claim 1, wherein said rotor comprises a disk that forms with said inner wall of said working chamber a front and a rear planar gap.

6. The heating device as claimed in claim 1, wherein said rotor comprises a cylinder that forms with said inner wall of said working chamber a front planar gap, a rear planar gap, and a radial annular gap.

7. The heating device as claimed in claim 5, wherein said rotor comprises a solid plastic component.

8. The heating device as claimed in claim 6, wherein said rotor comprises a solid plastic component.

9. The heating device as claimed in claim 1, wherein said intermediate wall comprises a planar wall between said working chamber and said cooling chamber arranged parallel to a planar face of said rotor, and wherein said intermediate wall is washed by said cooling fluid.

10. The heating device as claimed in claim 1, wherein said intermediate wall is of planar and cylindrical construction.

11. The heating device as claimed in claim 1, wherein the intermediate wall comprises cooling ribs on a cooling water side.

12. The heating device as claimed in claim 1, wherein the intermediate wall is inserted between two halves of said fixed housing and is sealed by seals arranged on both sides of said intermediate wall so that said intermediate wall comprises a separate component of said housing.

13. The heating device as claimed in claim 1, wherein the intermediate wall comprises a hollow disk which surrounds said rotor and forms with an inner wall of said fixed housing said cooling chamber, and wherein said cooling chamber comprises a front cooling gap, a rear cooling gap, and a circumferential cooling gap.

14. The heating device as claimed in claim 1, wherein said working chamber is sealed by a movable diaphragm which permits expansion of the viscous fluid into an expansion space.

15. The heating device as claimed in claim 1, wherein the working chamber is completely filled with viscous fluid.

16. The heating device as claimed in claim 1, wherein the device is used with an engine of a motor vehicle.

17. The heating device as claimed in claim 3, wherein said V-belt pulley is driven on an engine-side drive of said heating device.

18. The heating device as claimed in claim 16, further comprising an engine and a coolant circuit that fluidly cools said engine, wherein said rotor is driven by said engine and wherein said cooling chamber is connected with said coolant circuit.

19. The heating device as claimed in claim 18, further comprising a heating circuit, wherein said heating circuit is operatively connected to said coolant circuit so that the heating device operates as a supplementary heating device.

* * * * *